INVENTOR.
RICHARD B. GOODRUM
BY Hopgood & Calimafde
ATTORNEYS

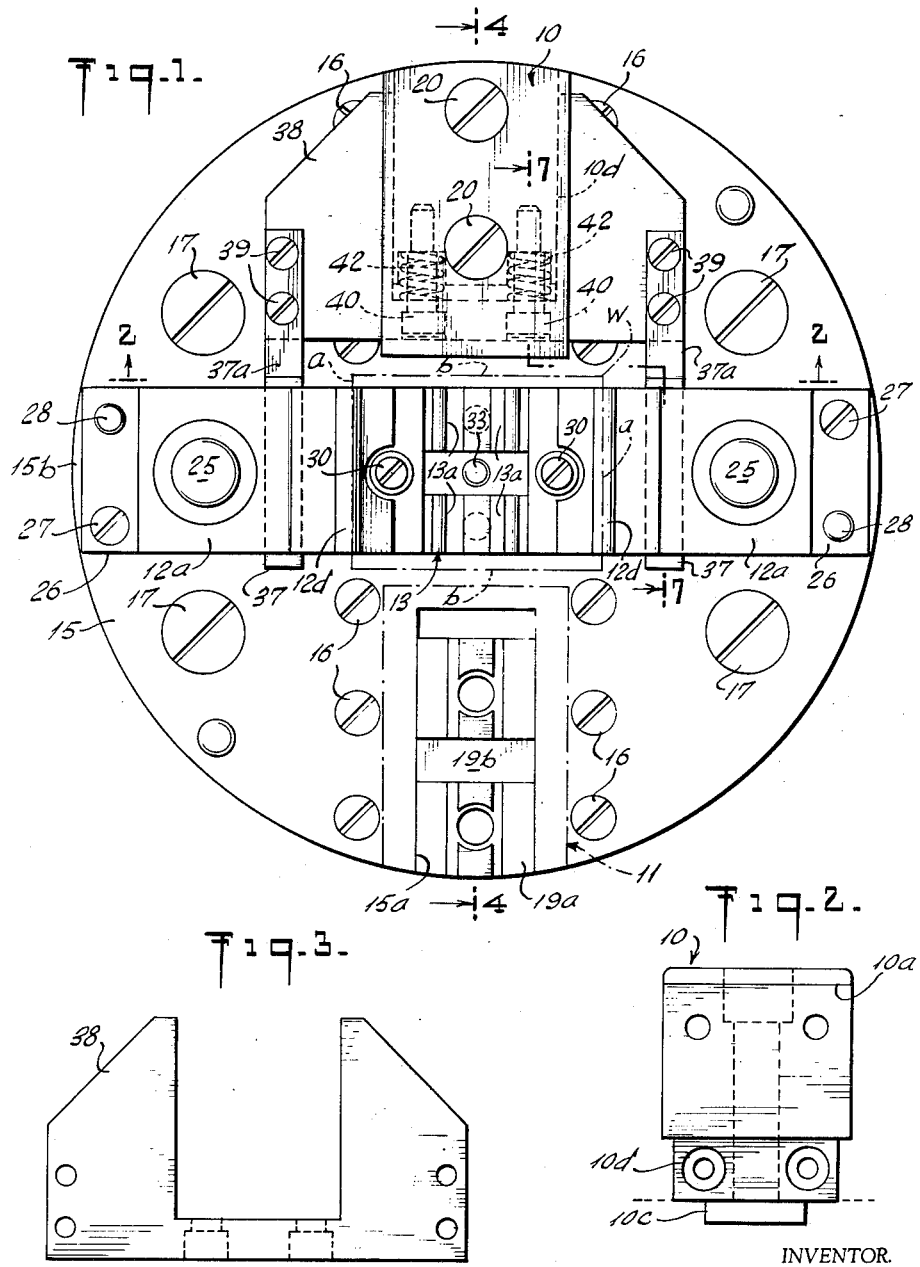

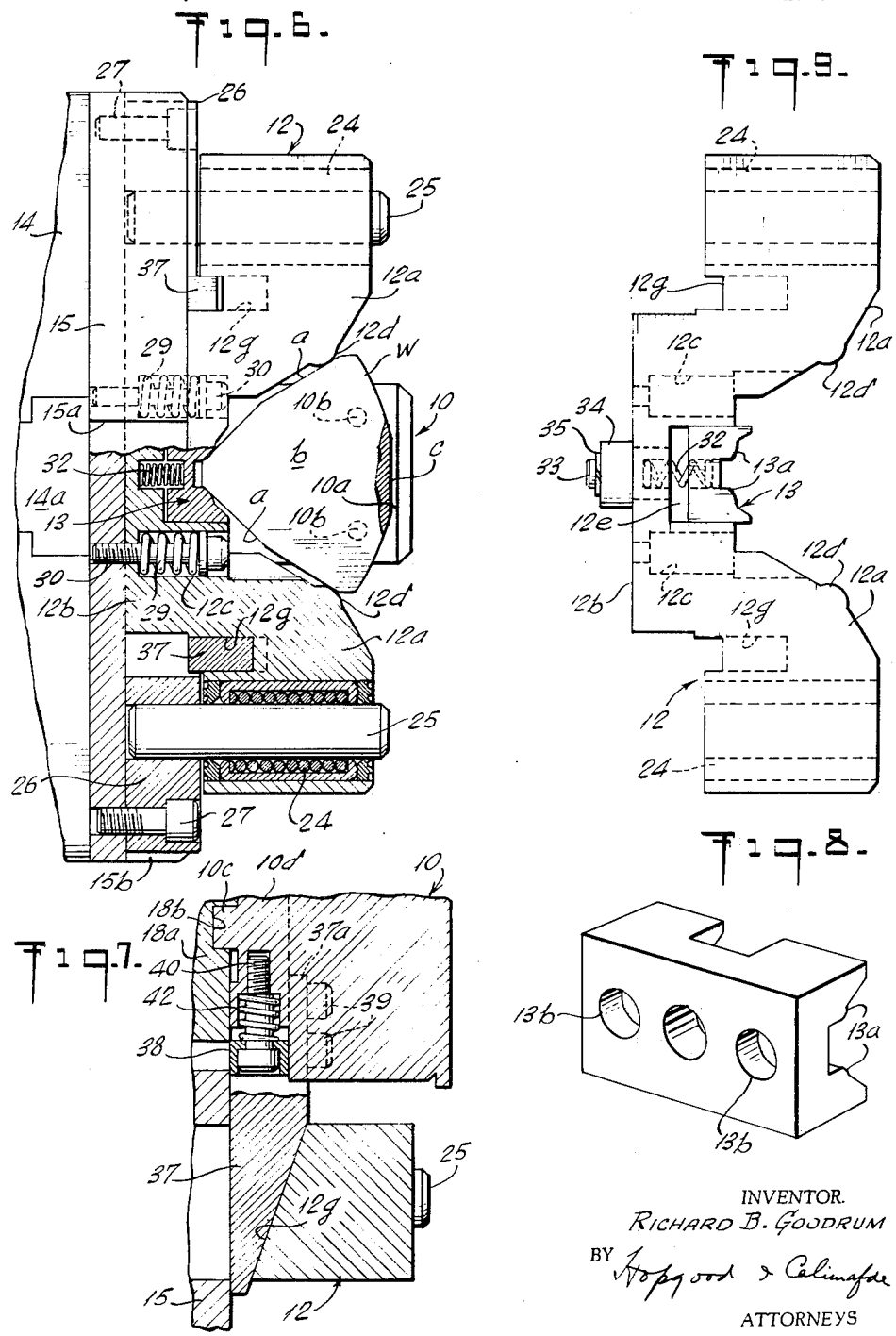

United States Patent Office 3,198,533
Patented Aug. 3, 1965

3,198,533
LATHE CHUCK
Richard B. Goodrum, Kensington, Conn., assignor to Cushman Industries, Incorporated, Hartford, Conn., a corporation of Connecticut
Filed Oct. 4, 1963, Ser. No. 313,949
18 Claims. (Cl. 279—121)

This invention relates to chucks, particularly those generally referred to as lathe chucks.

For purposes of explanation and definition, a horizontal orientation of the rotary axis of the chuck is assumed.

The invention provides a chuck with a novel arrangement of work locating and clamping means. The locating means is characterized by a device for moving the work to a require vertical location relative to the clamping means. Preferably, the required vertical location is established by stop means contacted with the work. More specifically, the locator device lifts the work until it contacts the stop means after which the work is held fast in stopped location by the clamping means.

The invention provides for concomitant, synchronous actuation of the clamping means and the work lifting locator device. More particularly, the claming means comprises a pair of jaws moved toward each other to clamp the work laterally. An operative connection is provided through which one of the jaws (when it moves toward the work) actuates the locator device to lift the work. Play is provided in the operative connection to enable the jaw to complete its travel toward the work after the locator device is arrested as a result of contact of the work with the stop means. The operative connection preferably includes lifting wedge means for the locator device.

At least one of the clamping jaws, preferably both, is formed with a projection overhanging the jaw face and coming into position over the work before the jaw face engages the work. The projection or projections on the jaws serve as the stop means against which the work is lifted by the locator device.

The invention provides the locator device with means for ejecting the work when released by the clamping jaws.

The subject chuck is especially adapted, in the disclosed embodiment, to be loaded with a work part which has no flat seating surface. The specific work part dealt with here is substantially a triangular prism with symmetrically convergent sides and is to be positioned in the chuck nose down and base up for face-machining. The work lifting locator device in the novel locating and clamping arrangement is provided with means for seating the prism at the nose end. The seating engagement permits rockable adjustment of the prism to centered position. According to the invention, the opposing clamping jaws are provided with yieldable guide elements protruding from the jaw faces and slightly leading the work stopping projections of the jaws. The guide elements make first contact with the work and guide it to centered relation between the jaws.

Other features and objects of the invention will be pointed out or will be apparent to those skilled in the art from the following description, in conjunction with the accompanying drawings. In said drawings, which show, for illustrative purposes only a preferred form of the invention.

FIG. 1 is a front face view of the chuck and shows the work part and one of the jaws in phantom in order to reveal the parts beneath;

FIG. 2 is a view in elevation of one of the jaws, as seen from the line 2—2 of FIG. 1.

FIG. 3 is a plan view of a wedge carrier in the operative connection between one of the jaws and the work lifting locator device;

FIG. 6 is a partly sectioned elevation of the chuck, with the jaw and its mounting slide nearest the viewing plane removed for purposes of the illustration;

FIG. 7 is a broken section along lines 7—7 of FIG. 1;

FIG. 8 is an enlarged perspective view of a secondary locator in the locator device; and FIG. 9 is an elevation of the locator device.

Figure 4:
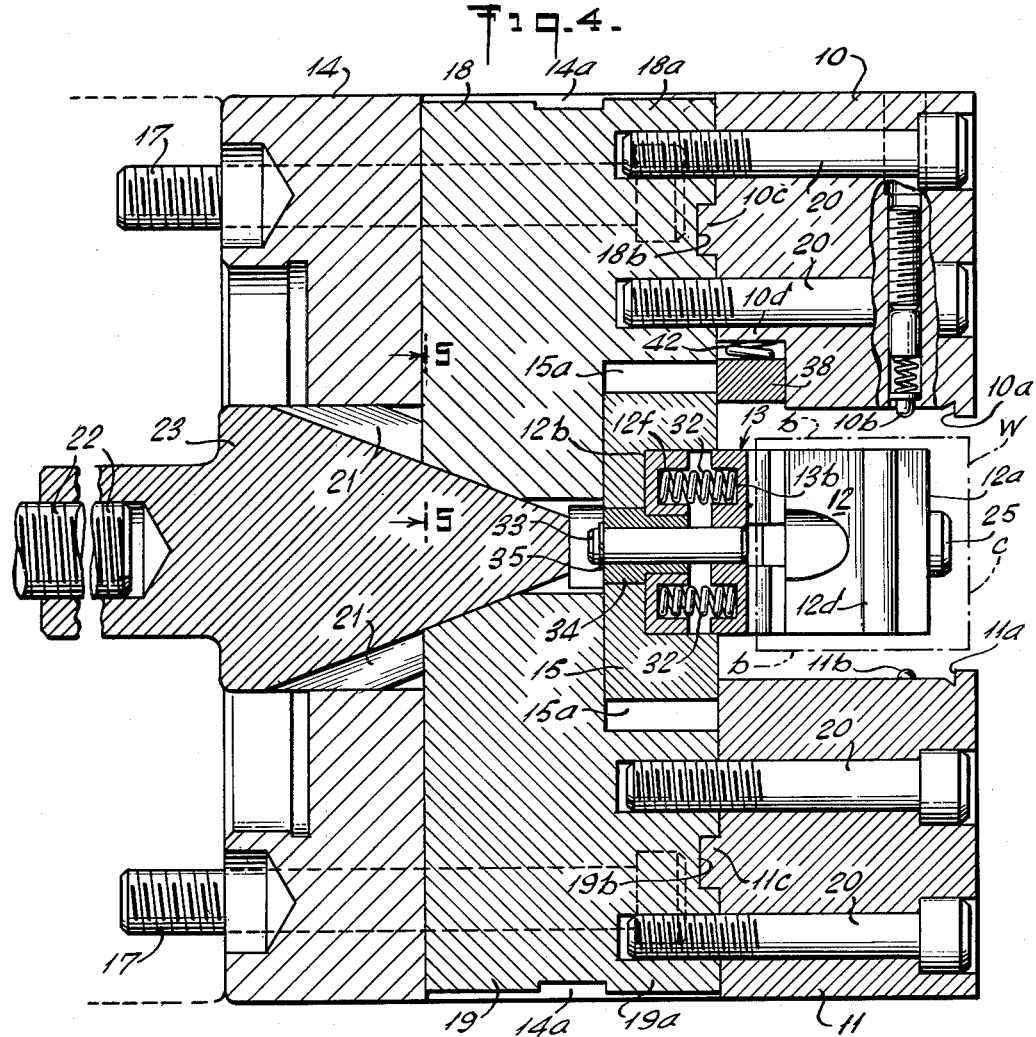
FIG. 4 is a selection on lines 4—4 of FIG. 1.

The illustrative embodiment of the subject chuck is adapted for holding, nose down, a substantially triangular prism or work piece W (FIGS. 1, 4 and 6). The prism W has symmetrically convergent sides $a$, planar end faces $b$ normal to the convergent sides, and top margins $c$ in a common plane normal to the end faces $d$.

The locating and clamping arrangement on the chuck includes a pair of horizontally movable opposing jaws 10 and 11 for clamping the end faces $b$ of the prism W between planar jaw faces. The arrangement further includes a vertically movable locator device, comprising a primary locator 12 and a secondary locator 13 carried thereby, for seating the prism nose down by engagement with the convergent sides $a$ of the prism and lifting the prism to required vertical location between the jaws. Jaws 10 and 11 have top flanges 10a and 11a overhanging and leading the jaw faces. During closing travel of the jaws, the locator device 12–13 rises at a proportionate rate to bring the top margins $c$ of the prism against the jaw flanges 10a and 11a just before the jaw faces securely close on the prism faces $b$. Flanges 10a and 11a thus serve as stop means to establish the vertical location of the prism between the jaws. Protruding from the faces of jaws 10 and 11 and leading the jaw flanges 10a and 11a by a very small mount are spring-pressed plungers 10b and 11b. These plungers make first contact with the end faces $b$ of the prism and guide the prism, during its final increment of rise, to laterally centered position between the jaw faces. In this centered position, the prism has its top margins $c$ properly located for engagement with the top flanges 10a and 11a of the jaws. When the prism is clamped in place, the jaw flanges 10a and 11a cover only the opposite narrow margins $c$ of the prism base and leave the base effectively exposed for face-machining, boxing, or other centered operation. Further description of the jaws 10 and 11 and the locator device 12–13 will be given later.

The chuck base comprises a block 14 and a base plate 15 fastened on the block by screws 16 (FIG. 1). Threaded elements 17 pass through the base plate 15 and the block 14 to serve in attaching the chuck to the drive or face plate, (not shown) on the spindle of a lathe or the like. Guided for radial movement in open-ended guideways 14a of block 14 are two, diametrically opposite jaw-mounting slides 18 and 19. Slides 18 and 19 are formed with narrowed, shortened extensions 18a and 19a slidably accommodated in slots 15a of the base plate 15. These slots are open at the outer end and are long enough to permit the slides to move from their outer, fully open position (FIG. 4) to their inner, relatively closed position. The faces of the slide extensions 18a and 19a respectively support the jaws 10 and 11 in laterally overlapped relation to the face of base plate 15. Jaws 10 and 11 are provided at the bottom with rectangular key slugs 10c and 11c fitting closely in slots 18b and 19b across the extensions 18a and 19a and are fixed in place on the extensions by screws 20.

Figure 5:
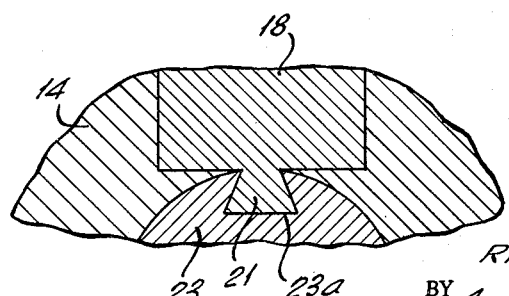
FIG. 5 is a fragmentary section lines 5—5 of FIG. 4.

Although provision may be made for manual actuation of slides 18 and 19 and the jaws 10 and 11 carried thereby, it is preferred to have the slides and jaws actuated by power. Hence the chuck is adapted for attachment to the drive plate on a hollow lathe spindle through which a power-actuated chucking rod passes. The forward end of such rod is shown in FIG. 4 where it is designated 22. Any suitable known means may be used to translate longitudinal movement of the rod 22 into radial movement of the slides. The chosen means comprises a wedge 23 axially slidably mounted in a central bore of the chuck block 14. Coacting angular splines or dove-tail means 21 and 23a of the slides and wedge (also see FIG. 5) key the slides to the wedge. When the chuck is attached to the drive plates on the hollow lathe spindle, the hub on the wedge 23 is screwed onto the forward end of the rod 22 so as to move axially with the rod. Axial movement of the rod to the left (FIG. 4) causes the wedge to pull the clamping means or jaw structures (comprising the slides and the jaws) toward each other to close on the work. Return of the rod and wedge to the right restores the clamping means or jaw structures to their outer position.

Referring particularly to FIGS. 1, 6 and 9, the primary locator member 12 is an elongated, flat-sided bar with symmetrical wings 12a bridged by a depressed middle section 12b. The section 12b has slidable fit in a rectangular groove 15b cut through base plate 15 along a diametral line at right angles to the diametral line of travel of the main jaws 10 and 11. Wings 12a are fitted in bores with anti-friction bushings 24. These bushings are slidable on guide rods or studs 25 held at their lower portions in bases 26, one at each end of the groove 15b. The bases 26 are fixed in place by screws 27 and dowels 28. When mounted on the guide rods 25, the primary locator 12 is centrally located in the groove 15b; that is, the center of the locator is at the chuck axis. Member 12 may slide up and down on the rods 25. Its down position is established by abutment of the flat bottom of the middle section 12b with the flat base of groove 15b. It is urged to this position by preloaded springs 29 contained in counterbored holes 12c in the middle section 12b. The springs are confined between the heads of screws 30, threaded into the base plate, and the shoulders of the holes 12c, thus pressing down on these shoulders to bottom the locator member 12.

The space between the wings 12a of primary locator 12 is large enough and of a contour to accommodate the prism W with the upper ends of its convergent sides tangentially sitting on spaced parallel rounded ribs 12d on the locator wings, ribs 12d being symmetrically opposed with respect to the chuck axis. Primary locator 12 thereby provides an upper, centering seat for the prismatic workpiece, a seat allowing the prism to adjust itself rockably to centered position in which its axis is aligned with the chuck axis. Opening into the space between the primary locator wings 12a and cutting centrally across the middle section 12b is a rectangular pit or recess 12e for vertically slidably nesting the secondary locator member 13. This member is rectangular except for a roughly V-profiled top having symmetrically opposed parallel ridges 13a, between which the lower ends of the convergent sides of prism W may be tangentially seated. The top of member 13 is relieved between the ridges 13a to afford room for the nose of the prism when the prism is seated on the ridges. Secondary locator member 13 thus provides a lower, centering seat for the prismatic workpiece W.

The secondary locator 13 also functions as a work ejector. To this end, a pair of preloaded coil springs 32 is imprisoned between opposing pockets 13b and 12f, respectively in the secondary and primary locators 13 and 12. Springs 32 urge the secondary locator to a position protruding above its housing pit 12e. A pin or stud 33 is fast to the secondary locator, passes freely through a guide bushing 34 fitted to the secondary locator section 12b, and carries a clip or snap ring 35 behind the bushing to limit the rise or projection of the secondary locator.

As previously mentioned, the locator assembly 12–13 is forced up during closing, forward travel of the main jaws 10 and 11. In the shown embodiment, the desired action is effected by means between the main jaw 10 and the locator assembly. Included in this means is a pair of parallel, duplicate lifting wedges 37 (FIGS. 1, 6 and 7). Wedges 37 extend forwardly from a carrier 38 (also see FIG. 3), mounted to the jaw 10, and pass through complementary notches 12g in the primary locator 12. The bases of the wedges rest on the base plate 15 and their upper, inclined edges have inclined plane engagement with the sloping tops of the notches 12g which open toward the base plate. The direction of slope is downward toward the free ends of the wedges and away from the carrier member 38 for the wedges, whereby upon forward movement of the number 38, toward the locator assembly, the wedges will lift the assembly against the resistance of the bottoming springs 29.

The wedge carrier 38 is a U-shaped member the arms of which have fastened thereon, by screws 39, rear bar extensions 37a of the wedges 37. Member 38 is carried by the main jaw 10, on a reduced lower section 10d of the jaw (see FIGS. 2 and 4) formed by rectangularly cutting back the body of the jaw at the front and sides. The member 38 has a straddling, sliding fit on the section 10d, with the crosspiece of the member facing the front of the jaw section and with the flat top surface of the member against the shoulder of the jaw section. Two cap screws 40, having smooth shank passage through the crosspiece of the member 38, are threaded into the reduced jaw section 10d to retain the member on the jaw 10. The screws 40 are of a length permitting the crosspiece of member 38 to be at overtravel distance from the front of the reduced section 10c of jaw 10, this distance being normally maintained by coil springs 42 around the screw 40. Thus, jaw 10 can continue to move forward an amount, limited to the overtravel distance, after the wedge carrying member 38 is stopped.

In the open position of the chuck, the wedge 23 (FIG. 4) holds the slides 18 and 19, and the jaws 10 and 11 thereon, in a radially outwardly extended position; the primary locator 12 (FIGS. 1, 4, 6, and 7) is bottomed in the groove 15b of the base plate 15 by the springs 29; and the secondary locator 13 is sprung axially outwardly to the limit by springs 32.

The workpiece, of which prism W is an example, is loaded into the chuck by first contacting it with its seat on secondary locator 13 and then pressing it down to its seat on primary locator 12, meanwhile depressing the secondary locator and compressing the springs 32; it will be understood that work insertion may be performed manually or by automatic means forming no part of the present invention. The top margins c of the work W are then in axial-clearance relation with the undersides of locating flanges 10a and 11a jaws 10 and 11. Power is now applied to rod 22 (FIG. 4) to move it to the left for effecting the closing travel of the jaws. As jaw 10 moves toward the work, it takes along the wedge carrier 38, and the wedges 37 on the carrier lift the locator device 12–13 and the work seated thereon. As governed by a properly chosen slope of the wedges, the closing travel of the jaws and the rise of the locator device are at a relative rate which brings the top margins c of the work against the jaw flanges 10a and 11a after these flanges reach a position over the margins c and before the jaw faces reach the faces b of the work, at this point manual or other insertion pressure may be released from the work piece. During the final increment of rise or projection of the work, it is laterally centered by engagement of its sides b with the guide elements 10b and 11b protruding from the jaw faces and leading the stop flanges 10a and 11a. Margins c of the work will thus be correctly positioned for contacting the stop flanges. With the top margins c of the work against the stop flanges, the locator device 12–13 is stopped in turn stopping wedges 37 and wedge carrier 38. The jaws 10 and 11 continue to advance, jaw 10 compressing springs 42 (FIGS. 1 and 7) until the jaw faces securely clamp the work in place.

To unload the work, power is applied for returning the rod 22 (FIG. 4) to the right, causing the jaws 10 and 11 to move back to their outer position. As soon as the jaws release the work, the secondary locator 13, under the power of springs 32, springs up and ejects the work.

Although the invention has been described in detail in connection with a preferred form, it will be understood that modifications may be made without departing from the scope of the invention as defined in the claims which follow.

What is claimed is:

1. For a lathe or the like, a chuck having a base and a work locating and clamping arrangement carried by the base and including clamp elements having relative closing movement to clamp a work part between them and a work locating device for moving the work part transversely of the direction of relative movement of the clamp elements so as to bring the work part into a required location between the clamp elements to be clamped thereby.

2. A lathe chuck having a base and a work locating and clamping arrangement carried by the base and including clamping means operable to close on and clamp a work part, a work locator device actuated to move the work part relative to the clamping means into a required location within the clamping means to be clamped thereby, and means coupled to said clamping means and the locator device for concomitantly and synchronously actuating the clamping means to close on the work and the locator device to bring the work part to the required location prior to the clamping means closing on and clamping the work part at said location.

3. As in claim 2, a yieldable connection being provided between the actuating means and the locator device to enable the locator device to be arrested while the clamping means continues and completes its closing action, and stop means for arresting the locator device upon the work part reaching the required location.

4. As in claim 2, the actuating means including an operative connection between the clamping means and the locator device through which the actuating means produces the action of the locator device for bringing the work part to the required location.

5. As in claim 4, said operative connection including camming means for the locator device.

6. As in claim 5, the camming means being wedge means in inclined plane engagement with the locator device.

7. As in claim 3, the clamping means including a clamp jaw with a jaw face to engage the work part, and the stop means including a work stop element projecting from the jaw angularly to and forwardly of the jaw face so as to confront the work part and arrest it at the required location, therethrough arresting the locator device, before the jaw face effectively engages the work part.

8. As in claim 3, the clamping means comprising opposing clamp jaws having relative horizontal closing movement to clamp the work part between the jaw faces, the locator device being operated by said actuating means to lift the work part in synchronism with the relative closing movement of the jaws, and the stop means comprising work stop elements provided on the respective jaws and overhanging the jaw faces so as to confront the work part and arrest it at the required location, therethrough arresting the locator device, before the jaw faces effectively clamp the work part.

9. As in claim 8, the jaws being provided with yieldable guide elements protruding from the jaw faces and leading the stop elements so as to engage the work part laterally and guide it into laterally centered position between the jaws during the final increment of movement of the work part toward the stop elements.

10. A lathe chuck comprising a base, clamping means carried thereby and including clamping structures having relative horizontal closing movement to clamp a work part between jaw faces, a locator device for seating the work part and mounted on the base for upward movement to lift the work part to a required vertical location between the jaws to be clamped thereby, and means for coordinately effecting the relative closing movement of the jaw structures and the upward movement of the locator device to bring the work part to the required vertical location before the jaw faces close on and effectively clamp the work part.

11. As in claim 10, and means biasing the locator device to a down position on the base and overcome by the means for effecting the upward movement of the locator device during the relative closing movement of the jaw structures.

12. As in claim 10, the locator device including means for ejecting the work part when released by the jaw structures.

13. As in claim 10, the means for effecting the upward movement of the locator device comprising mechanism associated with and actuated by one said jaw structure during movement of said jaw toward the work part.

14. As in claim 13, a yieldable connection being provided between said mechanism and the associated jaw structure through which the jaw structure during its advance to the work part actuates the mechanism to move the locator device upwardly, and stop means for encountering the work part upon the work part being lifted by the locator device to the required vertical location and thereby arresting the work part, the locator device and said mechanism, while the jaw structure associated with said mechanism continues to advance toward the work part for effective clamping engagement therewith.

15. As in claim 14, said mechanism including a member slidably mounted on the associated jaw structure for horizontal play, through an overtravel distance, to enable the jaw structure to overtravel the member toward the work part, and said yieldable connection being between the member and the associated jaw structure for normally maintaining said member at the overtravel distance from the associated jaw structure.

16. As in claim 10, the locator device comprising a primary locator and a secondary locator carried by the primary locator, means between the primary and secondary locator for springing the secondary locator to an upward position relative to the primary locator, the secondary locator being depressed relative to the primary locator when the work part is loaded into the chuck and clamped between the jaw structures and springing up to eject the work part upon the work part being released by the jaw structures.

17. As in claim 10, wherein the work part has symmetrically convergent sides, the locator device having rounded seating means for tangential seating engagement by the convergent sides, the engagement permitting the work part to adjust itself rockably to centered position.

18. As in claim 10, the means for coordinately effecting the relative closing movement of the jaws and the upward movement of the locator device including wedge means in inclined plane engagement with the locator device for controlling its upward movement.

References Cited by the Examiner
UNITED STATES PATENTS 2,660,440 11/53 Kurtz _____ 279—110
2,798,234 7/47 Benninghoff _____ 279—123
2,910,301 10/59 Mann.

ROBERT C. RIORDON, *Primary Examiner.*